(12) United States Patent
Kierkels et al.

(10) Patent No.: US 7,547,738 B2
(45) Date of Patent: Jun. 16, 2009

(54) FREE FLOWING MELAMINE CYANURATE AGGLOMERATE

(75) Inventors: Renier Henricus Maria Kierkels, Beegden (NL); Philippe Wolfgang Paul Valere Bleiman, Hasselt (BE); Stefan Hendrikus Schaafsma, Susteren (NL); Johannes Cornelis Jozef Mokveld, Schiedam (NL)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 327 days.

(21) Appl. No.: 11/439,322

(22) Filed: May 23, 2006

(65) Prior Publication Data
US 2006/0276572 A1 Dec. 7, 2006

Related U.S. Application Data

(63) Continuation-in-part of application No. 10/493,269, filed as application No. PCT/EP02/11646 on Oct. 17, 2002, now abandoned.

(60) Provisional application No. 60/330,632, filed on Oct. 26, 2001.

(30) Foreign Application Priority Data

Oct. 25, 2001 (NL) .................................. 1019234

(51) Int. Cl.
*C08K 5/357* (2006.01)
(52) U.S. Cl. ....................... 524/100; 523/205; 427/221; 428/402.22

(58) Field of Classification Search ................. 524/100; 523/205; 427/221; 428/402.22
See application file for complete search history.

(56) References Cited

U.S. PATENT DOCUMENTS 5,135,974 A    8/1992   Moore ........................ 524/101

FOREIGN PATENT DOCUMENTS

| DE | 4040276 | 6/1992 |
|----|---------|--------|
| EP | 0487974 | 6/1992 |
| EP | 0666259 | 8/1995 |
| JP | 5-310716 | 11/1993 |
| JP | 7-241774 | 9/1995 |
| JP | 13-206061 | 10/1999 |
| JP | 2001-206961 | 7/2001 |
| WO | 93/06157 | 4/1993 |

OTHER PUBLICATIONS

Derwent Abstract 92-217676/27 for DE 4040276 (Jun. 1992).
Derwent Abstract 92-184916/23 for EP 0487974 (Jun. 1992).

*Primary Examiner*—Peter Szekely
(74) *Attorney, Agent, or Firm*—Shiela A. Loggins

(57) ABSTRACT

The invention relates to agglomerates of flame-retardants, in particular melamine cyanurate, containing aggregates with an average size of between 0.1 and 50μ bonded to each other with the aid of an auxiliary material. This auxiliary material is present in a concentration of between 0.1 and 10 wt. %, relative to the total agglomerates weight, and has a softening point higher than 40° C.

The invention further relates to a method for producing said agglomerates, the use of the agglomerates in the preparation of polymer compositions, and polymer compositions containing melamine cyanurate.

4 Claims, No Drawings

FREE FLOWING MELAMINE CYANURATE AGGLOMERATE

This is a continuation-in-part of application Ser. No. 10/493,269, filed on Oct. 18, 2004, now abandoned, which is a national stage application of PCT/EP02/11646, filed Oct. 17, 2002, which claims benefit of U.S. provisional application No. 60/330,632, filed Oct. 26, 2001.

The invention relates to a free flowing melamine cyanurate agglomerate containing melamine cyanurate aggregates with an average size of between 0.1 and 50μ bonded to each other with the aid of an auxiliary material which is present in a concentration of between 0.1 and 10 wt. %, relative to the total weight of the agglomerate. In particular the invention relates to a melamine cyanurate that is useful as a flame retardant in polymers. It is essential that the melamine cyanurate be distributed as homogeneously as possible in the polymer. Such a homogeneous distribution is achieved in particular through a good flow behaviour of the powder, herein referred to as "free flowing", whether or not combined with the break-up of melamine cyanurate agglomerate into smaller particles upon addition to the polymer, hereinafter referred to as dispersion.

Such a melamine cyanurate agglomerate is known from EP-A-0 666 259. The melamine cyanurate agglomerate described in EP-A-0 666 259 consists of aggregates, with an average size of less than 100μ, which are bonded to each other by means of metal oxide particles. On account of the relatively weak bond, the agglomerate can be homogeneously distributed in polymers.

The term melamine cyanurate agglomerate is understood in the description of the present invention to be a melamine cyanurate particle consisting of a composition of melamine cyanurate aggregates and/or primary particles. These aggregates are bonded to each other by means of an auxiliary material. This auxiliary material is chosen so that the melamine cyanurate agglomerate breaks up into the separate melamine cyanurate aggregates and/or primary particles during incorporation into the polymer, as a result of which a homogeneous distribution of melamine cyanurate in the polymer can be achieved, provided that the aggregate particles themselves are on average not larger than about 50μ.

The term melamine cyanurate aggregate is understood in the description of the present invention to be a melamine cyanurate particle consisting of a plurality of primary particles.

Melamine cyanurate aggregate usually contains a small amount of water. The primary particles are bonded to each other via ionic bonds. The melamine cyanurate aggregates can only be reduced in size through mechanical grinding. Adding melamine cyanurate aggregates to a polymer, for example to a polymer melt with the aid of an extruder, does not sufficiently reduce the size of these melamine aggregates. If the aggregate has an average particle size that exceeds about 50μ, it will be impossible to obtain a homogeneous dispersion in a polymer.

The term primary particle is understood in the description of the present invention to be a melamine cyanurate crystal formed as a result of a chemical reaction of melamine with cyanuric acid. A primary particle usually has an average size of 0.1-2μ.

The disadvantage of the melamine cyanurate agglomerate described in EP-A-0 666 259 is that this agglomerate has a low storage stability. In this application, storage stability is understood to be the phenomenon of melamine cyanurate particles generally not breaking during handling and storage, before they are added to a polymer. The problem presented by broken melamine cyanurate particles is that they have an adverse effect on homogeneous dosing to a polymer melt and thus stand in the way of a homogeneous distribution in the polymer. This breakage can for example occur during transport.

The result of the breakage of the melamine cyanurate agglomerates is that smaller agglomerates are formed, but possibly also aggregates and/or primary particles as a result of which the particle size distribution of the melamine cyanurate agglomerates becomes broader. As a result, the quantity of particles smaller than 50μ increases even more.

In addition, segregation of the larger and smaller melamine cyanurate agglomerates can occur. Both the broader particle size distribution of the agglomerates and the segregation have a deteriorating effect on the good flow behaviour, also referred to as free flowing character, of the melamine cyanurate agglomerates.

The object of the invention is to provide melamine cyanurate agglomerates that do not have the aforementioned disadvantage.

The present invention relates to a free flowing flame melamine cyanurate agglomerate containing melamine cyanurate aggregates with an average size of between 0.1 and 50μ bonded to each other with the aid of an auxiliary material, which is present in a concentration of between 0.1 and 10 wt. %, relative to the total weight of the agglomerate, characterised in that the auxiliary material is an organic auxiliary material with a melting or softening temperature higher than 40° C.

With the melamine cyanurate according to the invention melamine cyanurate agglomerates having good storage stability are obtained. The storage stability can be determined in several ways. For this invention, use is made of the ball test described below. Due to the higher storage stability, less segregation or no segregation occurs between smaller, broken agglomerates and unbroken agglomerates, enabling more homogeneous addition to a polymer.

An added advantage is the fact that the agglomerates according to the invention retain their free-flowing properties during handling and storage. As a result, the agglomerates can be dosed to a polymer in a very constant manner. As a result of this highly constant dosing, a homogeneous distribution of the melamine cyanurate in the polymer is achieved.

Poor dosage applicability of melamine cyanurate gives rise to concentration fluctuations in the polymer. These concentration fluctuations result from the fact that a production batch is not homogeneous in composition. Poor dosage applicability of melamine cyanurate results in an erratic production process, for example a compounding process. Excessive quantities are added in order to prevent these fluctuations in the concentration of the melamine cyanurate. This results from the presence of insufficient quantities of melamine cyanurate in a polymer in some production batches to obtain the required flame retardation. Adding excessive quantities means that an extra quantity of a certain component is dosed to prevent this component from falling below a critical value despite fluctuations in concentration.

A constant concentration of the melamine cyanurate according to the invention in a polymer results not only in a constant composition in one individual polymer batch but also in the virtual absence of fluctuations in composition among the various production batches. As a result, it is possible for final processors, for example injection moulders, to process these polymers without any need to adjust the equipment within a batch or between batches.

With regard to flow behaviour, the agglomerates according to the invention have a flow value according to the Klein test, to be defined hereinafter, of lower than 5, preferably equal to or lower than No. 3. Most preferred are agglomerates with a flow value equal to or lower than No. 2, because these will enable good dosing to be achieved under virtually all conditions. A free flowing agglomerate is understood to be an agglomerate with a flow behaviour lower than number 5 on the Klein scale.

The organic auxiliary material binds the aggregates in an agglomerate particle to each other. However, the organic auxiliary material should not bind together the aggregates and/or primary particles so strongly that the agglomerates no longer disperse in the polymer. This means that, depending on the type or process or the process conditions in which the melamine cyanurate agglomerate is added to the polymer, different criteria may be imposed on the organic auxiliary material. In the case of processing in a polymer melt, the choice of auxiliary material is determined by the melting or softening point of the organic auxiliary material. The melting or softening point of the organic auxiliary material is chosen so that it is lower than the melting point of the polymer to which the melamine cyanurate agglomerate is added, or the processing temperature during addition to the polymer, respectively.

In those processes where the agglomerates are incorporated into a liquid polymer, a polymer solution or a polymer dispersion, for example a coating composition, the choice of auxiliary material is determined by the solubility of the auxiliary material in said liquid polymer, polymer solution or polymer dispersion.

Moreover, the melting or softening point of the organic auxiliary material should not be so low as to make it possible for the organic auxiliary substance to soften during storage, for example in a warm warehouse. This could cause the agglomerates to adhere to one another. Therefore, the melting or softening point of the organic auxiliary material will have to be higher than 40° C., preferably higher than 60° C., even more preferably higher than 80° C., especially for storage in tropical regions.

Suitable organic auxiliary materials are organic compounds, polymers or copolymers based on vinylpyrrolidone, vinyl acetate and vinyl caprolactam, or mixtures thereof. Also suitable are polymers or copolymers based on epoxies, urethanes, acrylates, esters, amides, stearates, olefins, cellulose derivatives or mixtures thereof. If the agglomerates are prepared from aqueous slurry, water-soluble organic auxiliary materials are of advantage because they can easily be added to this slurry.

When the melamine cyanurate agglomerate containing water-soluble organic auxiliary material is added to a liquid polymer, a polymer solution or a polymer dispersion, which contains water, the agglomerate is easily dispersible. Polyvinyl pyrrolidone, polyvinyl alcohol and polyvinyl caprolactam are easy to handle and can be used in a wide range of applications due to their good solubility in water.

The quantity of organic auxiliary material amounts to 0.1 to 10 wt. %, relative to the total agglomerate. If very high flame retardation requirements are to be met with the melamine cyanurate, preferably 0.1 to 5 wt. % is used, even more preferably 0.1-3 wt. % relative to the total agglomerate.

Melamine cyanurate aggregates that are suitable according to the present invention have an average size of 0.1-50μ. Melamine cyanurate aggregates with an average size of 0.1-10μ are preferred, most preferred are melamine cyanurate aggregates with an average size of 0.1-5μ because they are universally applicable in both standard processing operations, including injection moulding, and processing into thin products, including fibres, films and coatings.

In practice, the visual properties of products based on polymers containing melamine cyanurate are important. For this reason, the largest aggregates are smaller than 70μ, so that these aggregates remain invisible.

Average size is understood to mean the average of the largest size and the smallest size, this size also being the average over the total number of the agglomerates. This average size is also referred to as 'd50'. The agglomerates according to the invention are substantially of a round shape.

The bulk density of the melamine cyanurate agglomerate is not critical, but preferably lies between 400 and 1500 kg/m$^3$. This results in better flow properties, which also enables regular dosing into the polymer melt. In addition, smaller packages can be used than those needed for melamine cyanurate powders with a lower bulk density. More preferably, the bulk density lies between 400 and 700 kg/m$^3$, making it easy to achieve good mixing with other polymer additives. This will also enable the use of standard packages available in the market.

In principle, the average size of the agglomerates is not subject to constraints. However, the agglomerates preferably have an average diameter of more than 150μ because agglomerates with an average diameter of less than 150μ cause dusting problems. The average diameter of the agglomerates is usually not chosen higher than 5,000μ. Agglomerates whose diameter is too large can cause problems due to small openings that may be present in dosing or processing equipment. More preferred are melamine cyanurate agglomerates with an average size of 200-3,000μ. Most preferred are melamine cyanurate agglomerates with an average size of 250-1500μ because of their universal applicability in various polymer processing operations such as melt processing and addition to a liquid polymer, a polymer solution or a polymer dispersion, for example a coating composition.

Preferably, a fraction of agglomerate particles measuring less than 50μ amounts to less than 20 wt. % relative to the total agglomerates weight. More preferably, this fraction amounts to less than 10 wt. %, even more preferably to less than 5 wt. %. Agglomerates containing more than 20 wt. % of particles of a size below 50μ cause dusting problems during handling or when they are dosed to a polymer melt. Also, the presence of more than 20 wt. % particles smaller than 50μ is disadvantageous for the free flowing character of the agglomerate.

It has been found that the advantages mentioned for melamine cyanurate also apply to agglomerates of other flame retardant compounds, including halogen containing and halogen-free ones. However, preference is given to halogen-free flame retardant compounds, including triazine compounds such as melamine, ammeline and/or ammelide, higher condensation products thereof such as melem and/or melam; melamine derivatives such as melamine phosphate, melamine acetate, melamine pyrophosphate, melamine polyphosphate and/or melamine ammonium polyphosphate; metal compounds such as aluminium hydroxide, magnesium hydroxide, antimony trioxide, $Sb_2O_5$, zinc oxide, sodium antimonate, zinc stannate and/or zinc borate with or without water of crystallization, with which advantages can be achieved that are comparable to those described above for melamine cyanurate. The agglomerate in question is a free flowing flame retardant agglomerate containing flame retardant aggregates with an average size of between 0.1 and 50μ bonded to each other with the aid of an auxiliary material which is present in a concentration of between 0.1 and 10 percent by weight, relative to the total weight of the agglomerate, the auxiliary material being an organic auxiliary material with a melting or softening point higher than 40° C.

Said flame retardant agglomerate will preferably be composed of aggregates with an average size of between 0.1 and 25μ. The flame retardant agglomerate preferably contains melamine pyrophosphate, melamine polyphosphate, melamine ammonium polyphosphate and/or aluminium hydroxide.

Melamine cyanurate particles with a size of between 100 and 2000μ are further mentioned, as granules, in JP-A-7-149739. Granules are mentioned which are composed of particles of 0.1-1μ, which are mutually compacted and bonded with water. As a consequence, the particles are ionic-type bonded, rendering dispersion in the melt virtually impossible. According to the definitions given at the beginning of this application, these are aggregates of 100 to 2000μ. There is no mention of agglomerates consisting of aggregates that are bonded to each other with the aid of an auxiliary material. Water is not included in the definition of auxiliary material used here, because ionic-type bonds are formed. The ionic-type bonds make the aggregate difficult to disperse.

Melamine cyanurate in combination with polyvinyl pyrrolidone is further mentioned in JP-A-5-3107167. In this application, polyvinyl pyrrolidone is added to melamine and cyanuric acid and aggregates are formed whose dimensions are between 30 and 120μ. There is, however, no mention of agglomerates composed of dispersible aggregates. Moreover, this material contains many small particles smaller than 50μ.

The invention also relates to a method for preparing a free flowing melamine cyanurate agglomerate containing melamine cyanurate aggregates bonded to each other with the aid of an auxiliary material.

Such a method is mentioned in EP-A-0 666 259, where an inorganic auxiliary material is added during the preparation of melamine cyanurate from aqueous slurry of melamine and cyanuric acid. After the conversion to melamine cyanurate has taken place, the slurry is spray-dried. During spray drying the water evaporates and melamine cyanurate agglomerates are formed.

The melamine cyanurate agglomerates formed are only weakly bonded to each other. The disadvantage is that such a method possesses melamine cyanurate agglomerates with poor storage stability.

The object of the invention is to provide a method that does not give the aforementioned disadvantage. This object is achieved by bringing again into contact a portion of the agglomerates formed from the spray-dried slurry—containing melamine cyanurate aggregates and an auxiliary material—with the spray-dried slurry and because the auxiliary material is an organic auxiliary material with a melting or softening point that is higher than 40° C. This ensures that the melamine cyanurate agglomerate formed has good storage stability.

A further advantage is that this agglomerate shows less dust emission. Dust emission can be determined in several ways. In this invention dust emission is determined using the Heubach test that will be discussed later. Moreover, dust is also apparent from a large fraction of particles having a size of less than 50μ.

The slurry contains melamine cyanurate aggregates, a solvent or dispersant and an organic auxiliary material. A choice can be made from among various solvents, including water and alcohols. For process and environmental reasons water is preferred as solvent.

The desired size of the melamine cyanurate aggregates can be achieved by means of grinding. By grinding with a ball mill very fine aggregates can be obtained, with an average size of up to 0.1μ.

In a further embodiment of this method it is also possible to add other, functional substances during the formation of the agglomerate. These functional substances may for example be a second flame retarding component, a synergist, a release agent, a stabilizer and/or a pigment.

In this way a free flowing composition is provided that contains several functional substances, including a second flame retarding component, a synergist, a release agent, a stabilizer and/or a pigment. The advantages are not only a pre-determined distribution of the functional substances, but also that fewer mass flows need to be controlled during the preparation of a polymer composition.

The invention also relates to a polymer composition containing melamine cyanurate. Such composition is disclosed in EP-A-0 666 259.

However, the disadvantage of such polymer compositions is the relatively large fluctuation in the melamine cyanurate concentration of the polymer.

The object of the present invention is to provide polymer compositions that do not have this disadvantage. This object is achieved by the use of melamine cyanurate agglomerates according to the invention. This ensures that there are no or hardly any fluctuations in the amount of melamine cyanurate in the polymer composition.

An added advantage is that a lower melamine cyanurate concentration can be used while still obtaining good flame retardation.

The fluctuation in the composition can be determined for example by means of analysis of the amount of melamine cyanurate that is present in a polymer composition.

As a result, the fluctuation in, for example, a polyamide polymer composition is reduced from an average of 10% with fluctuations of +/−2% or more to fluctuations of less than +/−1%, preferably less than +/−0.75%, most preferably less than +/−0.5%.

Polymer compositions are understood to be polymer compositions that can be made flame retardant using the agglomerates referred to, including for example polyamides, polyimides, polyesters, polystyrenes, polyurethanes, epoxy resins, polycarbonates, polypropylene and mixtures of these materials. From these polymer compositions both moulded articles but also fibres and films can then be prepared using techniques that are known per se.

Polymers are further understood to be coating compositions. These coating compositions can among other things be used for applying a coating to, inter alia, wood, metal, stone, plastics, fibres and textile.

The invention finally relates to the use of the melamine cyanurate agglomerate in the preparation of polymer compositions. Advantages hereof are the good dosing properties, the low degree of dust formation and the high bulk density.

As a result of the good dosing properties, a more homogenous polymer composition is obtained. This not only gives a more constant product quality but also makes it possible to reduce the consumption of melamine cyanurate while still obtaining good properties of the polymer composition, for example flame retardation. The test methods used are described below:

Also subject of the invention is a method for producing a free flowing melamine cyanurate agglomerate.

Accordingly, disclosed is a method for producing a free flowing flame retardant melamine cyanurate agglomerate containing melamine cyanurate aggregates with an average size of between 0.1 and 50μ bonded to each other with the aid of an auxiliary material, which auxiliary material is present in a concentration of between 0.1 and 10 wt. % relative to the total weight of the agglomerate and which is an organic auxiliary material with a melting or softening point higher than 40° C., which method comprises spray-drying a slurry containing melamine cyanurate aggregates and the auxiliary material, collecting the resultant agglomerates, separating the agglomerates with the smallest average particle size, making a new slurry comprising the agglomerates of the smallest average particle size and spray-drying the new slurry.

Storage Stability: Ball Test

Storage stability is expressed as the increase in dust content measured before and after the ball test. The dust content is determined by means of the so-called ball dust test. In this test 50 g of the particles to be tested is placed, together with 36 steel balls (diameter 15 mm, weight 13.7 g) in a screen bottom pan on a shaking plate. The screen bottom pan must make a circular movement in the horizontal plane at a frequency of 250 revolutions per minute at an amplitude (top-top) of 15 mm. The standard duration of the ball test is 5 minutes. After the test the material is analysed for its particle size. This analysis is carried out by means of laser diffraction (Sympatec, Germany). If the particle size is too coarse for the laser diffraction analysis the oversize fraction is screened off and the particle size of the fine fraction is determined by means of laser diffraction, and subsequently the particle distribution is corrected for the coarse fraction that has been screened off. The percentage of particles that is smaller than 50µ relative to the original mass of the particles is a measure of the dust content. The higher the percentage of the particles that is smaller than 50µ after the ball dust test, the higher the dust content and the more the product will dust.

The storage stability is determined by the increase in the dust content measured before and after the ball dust test. The difference in dust content is the percentage of the particles with a particle diameter below 50µ after the test minus the percentage of the particles with a particle diameter below 50µ before the test. The higher the difference in dust content, the lower the storage stability.

Flow Properties in Accordance with the Klein Method

The flow properties are determined using the vessel method of Klein in *Klein; Seifen, Öle, Fette, Wachse*, 94, 849 (1968). This is a method that uses a series of outflow vessels wherein each has a different opening in the bottom. The material to be tested is added to the vessel and the outflow from the opening in the bottom of the vessel is studied. The qualification of the flow properties is determined by the smallest opening through which the powder can still flow. The material with the best flow properties has the lowest qualification, i.e. 1 (see Table 1). Materials in the classes numbered 1-4 are usually called free flowing.

TABLE 1

Flow properties in accordance with the Klein method

| Flow value No. | Flow through opening with a diameter of: [mm] | Qualification of the flow properties. |
|---|---|---|
| 1 | 2.5 | Very good |
| 2 | 5.0 | Good |
| 3 | 8.0 | More than adequate |
| 4 | 12.0 | Adequate |

TABLE 1-continued

Flow properties in accordance with the Klein method

| Flow value No. | Flow through opening with a diameter of: [mm] | Qualification of the flow properties. |
|---|---|---|
| 5 | 18.0 | Deficient |
| 6 | Not through No. 5. | Poor |

Dusting Behaviour: Heubach Test

The dusting behaviour is determined using the dust meter of Heubach (Langelsheim, Germany). This apparatus is used to determine the dusting behaviour in a manner prescribed by the supplier. This is a method in which the material to be tested is kept in motion in a rotating drum. The fine dust is sucked away by a horizontal air flow (0.04 m/sec) and collected on a filter. The amount of dust on the filter is a measure of the dustiness of the product.

Bulk Density

The bulk density is determined by calmly filling a fixed-volume cylinder with screened powder. The powder weight that the cylinder can hold is then converted into the bulk density in gram per liter. Measured according to ASTM D Standard 1895-89 (Method A).

Particle Size

The particle size and particle size distribution are determined by means of laser diffraction (Sympatec, Germany). For some particles, which are too big to permit of laser diffraction, the particle size and particle size distribution are determined by a screen analysis, in accordance with DIN 66165.

THE INVENTION IS ILLUSTRATED WITH REFERENCE TO THE FOLLOWING EXAMPLES

Comparative Experiment A 160.6 kg melamine, 165 kg cyanuric acid and water of 80° C. are contacted and mixed in a paddle mixer (2 m$^3$). After mixing 2 h and reaction at 80° C. 50 wt. % melamine cyanurate slurry is formed. Water is removed by evaporation in 6 h at 250 mbar. The resulting product consists of melamine cyanurate aggregates with a dry matter content of 99.8%. The average particle size of the aggregates is 980µ with a bulk density of 725 kg/m$^3$. The flow properties, measured in accordance with the Klein method, indicate: Flow value No. 2.

Using a ZSK 58 extruder the melamine cyanurate is compounded in PA 6 at a temperature setting of 260° C. After compounding granulates are injection moulded to form PA 6 moulded articles: plates measuring 80×80×1 mm. The melt temperature during injection moulding is 275° C.; the mould temperature is 85° C. The moulded articles contain white dots that can visually be observed at the surface. The white dots are found to have dimensions between 70 and 1000µ. X-ray diffraction and electron microscope analysis prove that the white dots are melamine cyanurate aggregates. This is melamine cyanurate starting material that has not been dispersed sufficiently homogeneously during compounding. These visible dots are a major disadvantage, for the moulded articles are used in the electrical and electronics industry, where the appearance of moulded articles as well as their surface properties is of great importance.

Comparative Experiment B

Melamine cyanurate aggregates with an average particle size of 1000μ from Comparative experiment A are ground using a pin mill to obtain a powder with an average particle size, also referred to as 'd50', of 4μ. The values for this material are given in Table 2.

The dust content measured according to Heubach, 50 l, is 2200 mg/m³. The melamine cyanurate powder has poor flow properties (according to Klein). The flow value is No. 6. During compounding the poor flow properties are manifested in poor dosing properties on a Werner & Pfleiderer ZSK58 twin-screw extruder. The melamine cyanurate is force-fed to a ZSK 58 extruder and is compounded in polyamide 6 at a temperature of 260° C. After compounding granulates are injection moulded to form PA 6 moulded articles: The melt temperature during injection moulding is 275° C., the mould temperature is 85° C. The moulded articles (plates measuring 80×80×1 mm) had a good visual appearance. No white dots are observed.

Comparative Experiment C

The flow properties of a commercially available material ('MC410', Nissan) are determined and compared with the material according to the invention. Although this material is found to have good flow behaviour, it contains much dust, which is undesirable from a handling and professional hygiene point of view. The parameters measured are included in Table 2.

Example I

During spray-drying according to the invention a slurry, containing 40% melamine cyanurate aggregates, as obtained from comparative experiment B, in an aqueous solution with polyvinyl alcohol (0.20% Mowiol® 40-88, Clariant), [FIG. 1; flow (1)] is sprayed in a spraying tower (7) via a 7-inch disc atomizer, speed N=11000 rpm down to a spraying zone (2) and dried in an air flow (5). After drying the spray-dried agglomerates contain 0.5% polyvinyl alcohol, relative to the total mass. Spray-dried melamine cyanurate agglomerate is collected, in a container or fluid-bed (3), and is classified. This involves the separation of the melamine cyanurate agglomerate with the smallest average particle size and its return (4) to the spraying zone of the spray dryer. Agglomerates of the right average size (6) are discharged and packed.

The agglomerates that are returned (4) are brought again into contact with the sprayed slurry in the spraying zone (2). The returned agglomerates have an average diameter of less than 50μ.

The other conditions are as follows: air inlet temperature 230° C., air outlet temperature 92° C., slurry temperature 23° C., throughput: 60 kg melamine cyanurate agglomerate ('dry matter') per hour.

TABLE 1

Comparison of standard melamine cyanurate aggregates and melamine cyanurate agglomerates according to the invention

| Material from . . . | | | Comparative Exp. B | Comparative Exp. C | Example I |
|---|---|---|---|---|---|
| Organic auxiliary material | | | None | nd | Polyvinyl alcohol* |
| Quantity of auxiliary material in final product | | % | 0 | nd | 0.5 |
| Particle diameter | $d_{10\#}$ | μ | nd | 26 | 68 |
| Particle diameter, average | $d_{50}$ | μ | 4** | 68 | 163*** |
| Particle diameter | $d_{99\#\#}$ | μ | 50 | 238 | 952 |
| Fraction of particles smaller than 50 μ | | wt % | 99 | 32 | 3.7 |
| Bulk density | | kg/m³ | 260 | 517 | 610 |
| Flow value (Klein test) | | No. | 6 | 2 | 2 |
| Dust content (Heubach, 50 l) | | mg/m³ | 2200 | 4625 | 1520 |

*MOWIOL 40-88
**Aggregates
***Agglomerates composed of aggregates with an average size of 4 μm
Diameter at which 10% of the particles has a diameter smaller than this d10 value
Diameter at which 99% of the particles has a diameter smaller than this d99 value
nd: Not determined Example II Melamine polyphosphate (M200, DSM Melapur®) is spray-dried from aqueous slurry (40% solids) containing 1.6% polyvinyl alcohol (MOWIOL 40-88) to form agglomerates with an average particle size of 315μ. The agglomerates have good flow behaviour, No. 2.

The agglomerates are dosed by means of a gravimetric dosing apparatus (Colortronic, twin-screw with vertical agitator) at a throughput of 50 kg/h. The quantity that is actually dosed is monitored using a balance (Mettler Toledo, weighing range 30 kg, resolution 0.1 g). The quantity actually dosed, and thus the actual throughput, is determined every second. The dosing rate is determined on the basis of the spread (2σ) in the throughput values measured. Due to their free-flowing character the agglomerates can be dosed in a highly constant manner. The spread (2σ) is +/−0.7%.

Comparative Experiment D

Melamine polyphosphate (M200, DSM Melapur®) with an average particle size of 10μ, flow number No. 6, is subjected to the dosing test mentioned in Example II. Because of the poor flow behaviour of the powder, dosing at the same settings does not proceed in a constant manner, which is manifested in large variation in the throughput of the apparatus. The spread (2σ) is +/−26%.

Example III

Magnesium hydroxide (Magnifin H5, Albermarle) is introduced into aqueous slurry containing 35% magnesium hydroxide and 1.75% polyvinyl alcohol (MOWIOL 8-88) and spray-dried. The resulting agglomerates contain 5% polyvinyl alcohol and have an average particle size of 280 μm. The agglomerates have excellent flow behaviour: flow number No. 2, in accordance with the Klein method. The dust number is 1680 mg/m$^3$ (Heubach test, 50 l).

Comparative Experiment E

By means of a ZSK30 twin-screw extruder (Krupp Werner & Pfleiderer) a melamine cyanurate agglomerate with a particle size $d_{50}$=710 μm, containing 11% binder (polyvinyl alcohol MOWIOL 8-88), is processed in NYLON 6 (Akulon K122, DSM) at a temperature setting of 260° C. After compounding the granulate obtained is injection moulded to form rods measuring 125×13×0.8 mm. These rods are conditioned for 168 h at 70° C. Then the flame retardation is determined in 25-fold in accordance with the vertical burning test UL-94V of Underwriters Laboratories.

In this test the compound on the basis of the above-mentioned melamine cyanurate agglomerates scores 12 V-0 classifications and 13 V-2 classifications, compared to 25 times V-0 for the reference on the basis of the material from Example I. The flame retardation is adversely affected by the presence of an excessive quantity of auxiliary material.

The invention claimed is:

1. A free flowing flame retardant melamine cyanurate agglomerate with a diameter of more than 150μ and less than 5,000μ, containing melamine cyanurate aggregates with an average size of between 0.1 and 50μ bonded to each other with the aid of an auxiliary material, which auxiliary material is present in a concentration of between 0.1 and 10 wt. % relative to the total weight of the agglomerate and which is selected from the group consisting of polyvinyl alcohol, polyvinyl pyrrolidone and polyvinyl caprolactam, and where the agglomerate is obtained by a method which comprises spray-drying a slurry containing melamine cyanurate aggregates and the auxiliary material, collecting the resultant agglomerates, separating the fraction of agglomerate particles measuring less than 50μ, which particles amount to less than 20 wt. % of the agglomerates relative to the total agglomerate weight making a new slurry comprising the agglomerate particles measuring less than 50μ and spray-drying the new slurry, and collecting the agglomerate with a diameter of more than 150μ and less than 5,000μ, wherein the fraction of agglomerate particles measuring less than 50 microns amounts to less than 20 wt. % relative to the total agglomerates weight.

2. The melamine cyanurate agglomerate of claim 1, characterised in that the bulk density of the agglomerate is between 400 and 1500 kg/m$^3$.

3. The melamine cyanurate agglomerate of claim 1, characterised in that the average size of the agglomerate is between 250 and 1500μ.

4. A method for producing a free flowing flame retardant melamine cyanurate agglomerate with a diameter of more than 150μ and less than 5,000μ containing melamine cyanurate aggregates with an average size of between 0.1 and 50μ bonded to each other with the aid of an auxiliary material, which auxiliary material is present in a concentration of between 0.1 and 10 wt.% relative to the total weight of the agglomerate and which is an organic auxiliary material with a melting or softening point higher than 40° C., which method comprises spray-drying a slurry containing melamine cyanurate aggregates and the auxiliary material, collecting the resultant agglomerates, separating the fraction of agglomerate particles measuring less than 50μ, which particles amount to less than 20 wt. % of the agglomerates relative to the total agglomerate weight making a new slurry comprising the agglomerates measuring less than 50μ and spray-drying the new slurry, and collecting the agglomerate with a diameter of more than 150μ and less than 5,000μ.

* * * * *